United States Patent Office 2,900,216
Patented Aug. 18, 1959

2,900,216

PROCESS FOR THE DYEING OF POLYMERS OF ACRYLONITRILE OR ASYMMETRIC DICYANOETHYLENE

Heinz Werner Schwechten, Josef Singer, and Otto Bayer, Leverkusen-Bayerwerk, Germany, assignors to Farbenfabriken Bayer Aktiengesellschaft, Leverkusen, Germany, a corporation of Germany No Drawing. Application May 22, 1956
Serial No. 586,388

Claims priority, application Germany May 28, 1955

12 Claims. (Cl. 8—39)

This invention relates to the dyeing of polymers based on acrylonitrile or asymmetrical dicyanoethylene with basic anthraquinone dyestuffs.

We have found that basic arylamino-anthraquinones which are substituted in the aryl group by radicals containing one or more aliphatically linked amino groups which may be substituted or quaternized, and which can be substituted in the anthraquinone radical by other groups, are very suitable for the dyeing of polymers or co-polymers based on acrylonitrile or asymmetrical dicyanoethylene.

The arylamino-anthraquinones which are suitable for the process of the present invention may contain one or more aryl-amino groups. The linkage of the aliphatically linked amino group or amino groups with the aryl radical may be effected either via a purely aliphatic chain or via an aliphatic chain containing hetero-atoms such as —O—, —S—, —NR— or —SO$_2$—. The aliphatically linked amino groups may be further substituted or quaternized, for example, by alkyl- or cycloalkyl groups whereby the alkyl groups may also form a heterocyclic ring, for example

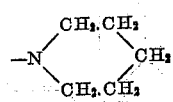

or

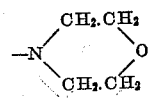

The aryl radical and the anthraquinone radical may themselves be substituted, for example, by halogen- or a hydroxyl-, alkoxy-, amino- or substituted amino group. Examples of such dyestuffs are:

| | Shade on polyacrylonitrile (staple fiber type Orlon 42 (Du Pont)) |
|---|---|
| (1) | reddish blue. |
| (2) | Do. |
| (3) | greenish blue. |
| (4) | clear blue. |
| (5) | Do. |

| | Shade on polyacrylonitrile (staple fiber type Orlon 42 (Du Pont)) |
|---|---|
| (6) 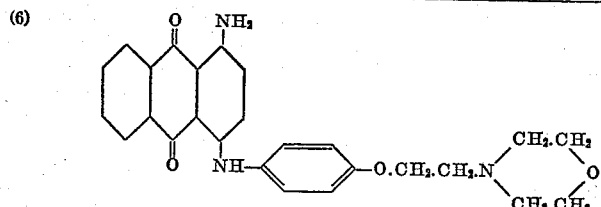 | clear blue. |
| (7) 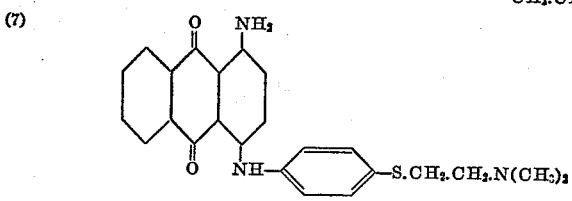 | Do. |
| (8) 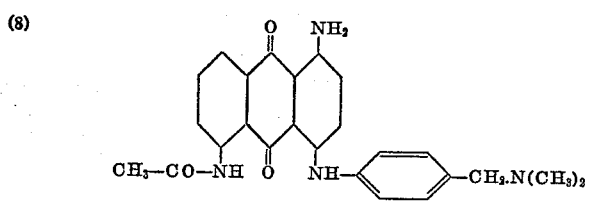 | blue. |
| (9) 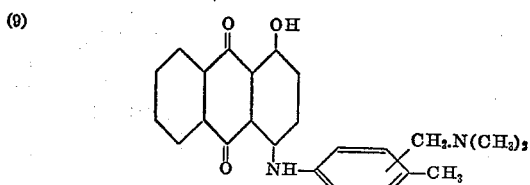 | violet. |
| (10) 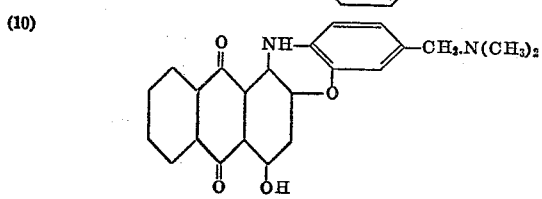 | reddish blue. |
| (11) 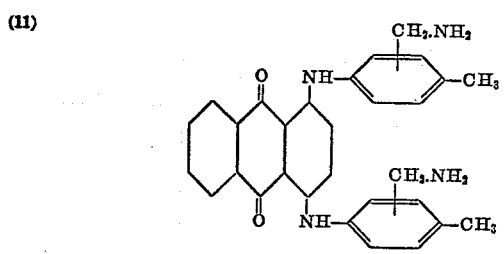 | green. |
| (12) 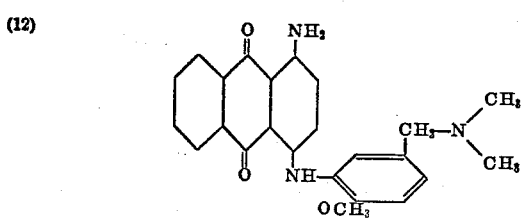 | blue. |
| (13) 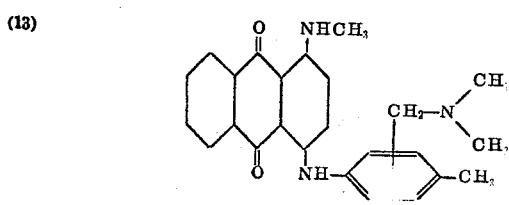 | greenish blue. |

| | Shade on polyacrylonitrile (staple fiber type Orlon 42 (Du Pont)) |
|---|---|
| (14) 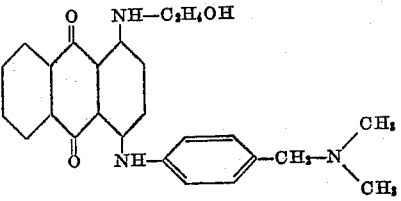 | blue. |
| (15) 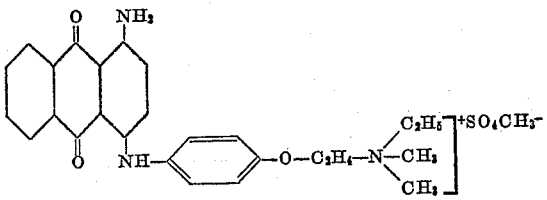 | Do. |
| (16) 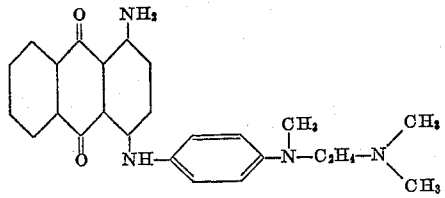 | greenish blue. |

The anthraquinones used for the new process may be obtained in known manner, for example, by reacting halogen-anthraquinones with amines of the general formula

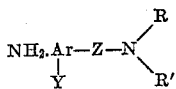

wherein Ar denotes an aryl radical, R and R' hydrogen or an alkyl radical which may form a ring, Z an aliphatic chain which may contain hetero-atoms such as —O—, —S—, —NR— or —SO$_2$, and Y one or more substituents such as halogen, or a hydroxyl, alkoxy, amino or substituted amino group.

In the case of derivatives of the 1-amino-4-aryl-aminoanthraquinones, they may also may be produced in known manner by reacting 1-amino-4-bromo-anthraquinone-2-sulfonic acid with amines of the above general formula and by splitting off the sulfo group from the reaction products thus obtained.

The dyestuffs thus obtained can be quaternized by known methods.

The dyeing of the polymers of acrylonitrile or asymmetric dicyanoethylene is effected from a slightly acid bath at elevated temperature, if desired in a closed vessel at temperatures above 100° C. in known manner. The full shades thus obtained distinguish themselves by their very good fastness to wetting and some of them by very good fastness to light. Co-polymers of acrylonitrile or asymmetric dicyanoethylene which contain for example acrylic acid esters or vinyl acetate can be used also for the process of the present invention.

The dyestuffs are also very well suited for spinning into polymers based on acrylonitrile according to the well known dry spinning process from a dimethylformamide solution.

The present invention is further illustrated by the following examples, without, in any way, limiting it thereto.

*Example 1*

Hanks of co-polymers of acrylonitrile are dyed on the boiling water bath for an hour in an aqueous solution containing 1 percent (referred to the weight of the dyeing goods) of a dyestuff of the following general formula:

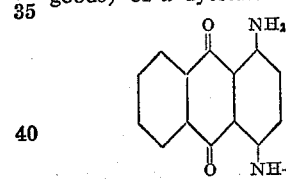

using a liquor-to-goods ratio of 40:1, with the addition of 3 percent of 30 percent acetic acid and 1.5 grams of sodium acetate. A full reddish blue dyeing is obtained of very good fastness to wetting and to light.

*Example 2*

Hanks of co-polymers of asymmetric dicyanoethylene are dyed according to the instructions given in Example 1, with 1 percent of a dyestuff of the general formula:

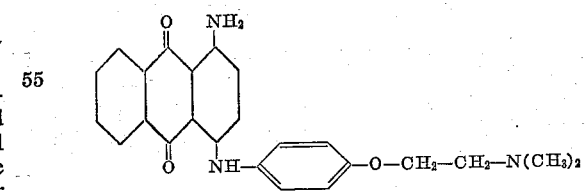

A full and pure blue dyeing is obtained having good fastness to wetting and very good fastness to light.

*Example 3*

Hanks of polyacrylonitrile are dyed in a closed vessel in aqueous solution containing 1 percent (referred to the weight of the polyacrylonitrile) of the dyestuff described in Example 1, 3 percent of 30 percent acetic acid and 1.5 percent of sodium acetate, using a liquor-to-goods ratio of 40:1. The aqueous solution is heated within 20–30 minutes to 120–125° and the polyacrylonitrile dyed at this temperature for about one hour. Thereafter the dyed polyacrylonitrile is washed and dried. A reddish blue dyeing is obtained of very good fastness to wetting and to light.

We claim:
1. A process for the dyeing of a polymer based on a member selected from the group consisting of acrylonitrile, asymmetrical dicyanoethylene and copolymers thereof in an acid dye bath which comprises using as dyestuff a basic phenylaminoanthraquinone which is substituted in the phenyl nucleus by a radical having the formula

—R—Y in which R is a member selected from the group consisting of a lower alkylene radical, an oxy-lower alkylene radical, a thio-lower alkylene radical and an imino-lower alkylene radical, and Y is a member selected from the group consisting of an unsubstituted, lower-alkyl-substituted and quaternized amino group.

2. A process as in claim 1 wherein R is a lower alkylene radical, Y is an unsubstituted amino group and the phenyl nucleus is further substituted by a lower alkyl radical.

3. A process as in claim 1 wherein R is a lower alkylene radical, Y is a di-lower alkyl substituted amino group and the phenyl nucleus is further substituted by a lower alkyl radical.

4. A process as in claim 1 wherein R is an N-lower alkyl imino lower alkylene radical and Y is a di-lower alkyl substituted amino group.

5. A process for the dyeing of a polymer based on a member selected from the group consisting of acrylonitrile, asymmetrical dicyanoethylene and copolymers thereof in an acid dye bath which comprises using as dyestuff a compound of the formula

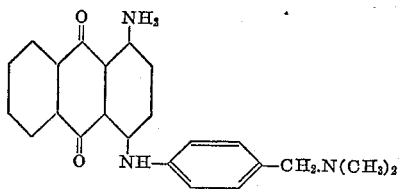

6. A process for the dyeing of a polymer based on a member selected from the group consisting of acrylonitrile, asymmetrical dicyanoethylene and copolymers thereof in an acid dye bath which comprises using as dyestuff a compound of the formula

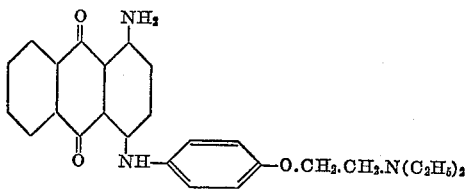

7. A process for the dyeing of a polymer based on a member selected from the group consisting of acrylonitrile, asymmetrical dicyanoethylene and copolymers thereof in an acid dye bath which comprises using as dyestuff a compound of the formula

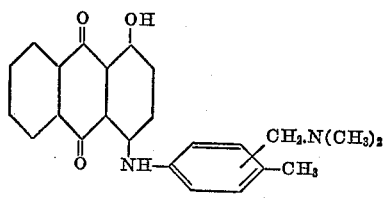

8. A process for the dyeing of a polymer based on a member selected from the group consisting of acrylonitrile, asymmetrical dicyanoethylene and copolymers thereof in an acid dye bath which comprises using as dyestuff a compound of the formula

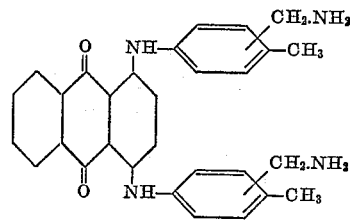

9. A member selected from the group consisting of a polymer based on acrylonitrile, asymmetrical dicyanoethylene and co-polymers thereof which has been dyed with a compound of the formula

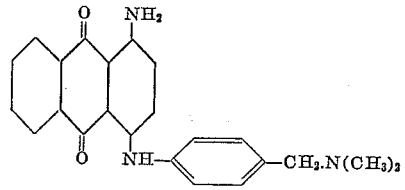

10. A member selected from the group consisting of a polymer based on acrylonitrile, asymmetrical dicyanoethylene and co-polymers thereof which has been dyed with a compound of the formula

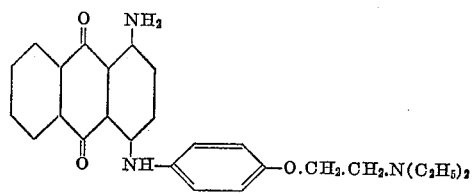

11. A member selected from the group consisting of a polymer based on acrylonitrile, asymmetrical dicyanoethylene and co-polymers thereof which has been dyed with a compound of the formula

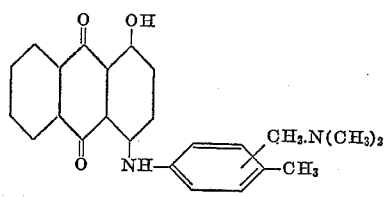

12. A member selected from the group consisting of a polymer based on acrylonitrile, asymmetrical dicyanoethylene and co-polymers thereof which has been dyed with a compound of the formula

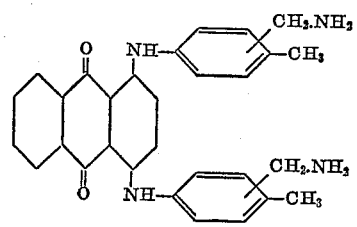

References Cited in the file of this patent
UNITED STATES PATENTS

| | | |
|---|---|---|
| 1,980,025 | Wolfram | Nov. 6, 1934 |
| 2,717,823 | Lowe | Sept. 13, 1955 |
| 2,730,534 | Hoefle | Jan. 10, 1956 |

OTHER REFERENCES

Vickerstaff: The Physical Chem. of Dyeing, 2nd ed., 1954, Intersci. Publ. Inc., p. 17.